United States Patent
Roberts et al.

(10) Patent No.: US 9,667,632 B2
(45) Date of Patent: May 30, 2017

(54) RELIABLE CONFIGURATION FOR NETWORK ACCESS

(71) Applicant: Texas Instruments Incorporated, Dallas, TX (US)

(72) Inventors: Christopher Robin Roberts, Richardson, TX (US); Harshal S. Chhaya, Plano, TX (US); Jamie Graves, Corinth, TX (US); Drew Paterson, Plano, TX (US); Lu Anne Bourland, Carrollton, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 132 days.

(21) Appl. No.: 14/515,238

(22) Filed: Oct. 15, 2014

(65) Prior Publication Data

US 2015/0103696 A1     Apr. 16, 2015

Related U.S. Application Data

(60) Provisional application No. 61/891,144, filed on Oct. 15, 2013.

(51) Int. Cl.
*H04L 29/06* (2006.01)
*H04W 12/08* (2009.01)
*H04W 88/08* (2009.01)

(52) U.S. Cl.
CPC .......... *H04L 63/101* (2013.01); *H04W 12/08* (2013.01); *H04W 88/08* (2013.01)

(58) Field of Classification Search
CPC ..................................... H04L 63/101
See application file for complete search history.

(56) References Cited

U.S. PATENT DOCUMENTS

| | | | |
|---|---|---|---|
| 7,277,547 B1* | 10/2007 | Delker | H04L 63/0272 380/270 |
| 2012/0210401 A1* | 8/2012 | Pepin | H04L 63/101 726/4 |
| 2013/0031608 A1* | 1/2013 | Alfano | H04L 41/042 726/3 |

* cited by examiner

*Primary Examiner* — Derrick Ferris
*Assistant Examiner* — Kevin Lee
(74) *Attorney, Agent, or Firm* — Rose Alyssa Keagy; Charles A. Brill; Frank D. Cimino

(57) ABSTRACT

A system, method and device for reliable configuration for network access. The method includes connecting an AP to a computer, connecting one or more clients over wired connection to the PC, collecting wireless addresses from all clients and sending the wireless addresses to the AP to populate an access control list, and collecting network name from AP and sending the network name to clients over wired connection.

11 Claims, 2 Drawing Sheets

\## RELIABLE CONFIGURATION FOR NETWORK ACCESS

CROSS REFERENCES TO RELATED APPLICATIONS

This application claims priority from U.S. Provisional Patent Application No. 61/891,144 filed on Oct. 15, 2013, which is hereby incorporated by reference in its entirety.

BACKGROUND OF THE INVENTION

Field of the Invention

Embodiments of the present invention generally relate to a method and apparatus for a reliable configuration allowing for accessing a network.

Description of the Related Art

There are many situations where access to a network needs to be limited to a specific set of devices. For example, to avoid unauthorized access, a teacher may choose to limit access a network to specific devices in a classroom. In such a situation, using network-specific passwords may be used to limit such access. However, such passwords are not effective due to several reasons because password protection requires sharing and regularly updating such password to maintain confidentiality and security. Limiting access without relying on network passwords is challenging because the network controller, such as, a router, WiFi, access point, etc., needs to have the list of clients that are allowed to connect and the clients need to know which APs to connect to. Thus, configuring clients to connect to specific networks in single network becomes challenging and in multiple networks (e.g. a school building or a conference hall) proves to be even more difficult.

Therefore, there is a need for an improved method and device to allow for connecting a client to a network while preventing unauthorized access to the network.

SUMMARY OF THE INVENTION

Embodiments of the present invention relate to a system, method and device for reliable configuration for network access. The method includes connecting an AP to a computer, connecting one or more clients over wired connection to the PC, collecting wireless addresses from all clients and sending the wireless addresses to the AP to populate an access control list, and collecting network name from AP and sending the network name to clients over wired connection.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

To allow for a reliable configuration for network access, wireless addresses, such as, a MAC address, of the wireless clients are used to create an 'access control list'. The list is then added to the access point. In one embodiment, the clients are configured with the AP's network name to connect to the designated network without additional configuration. The end result is little or no additional configuration needed to use the network. Wireless addresses may be deleted or added from the AP's access control list. The clients may also connect to other networks if needed.

For example, a set of handhelds or calculators may be connected to a PC through a docking station. The PC may also be directly connected to the access point. A software application running on the PC may collect the wireless IDs or MAC addresses from the handheld or calculator over the USB connection and configures the AP with this information. It also allows the user to name the network and then store the network name as the "preferred network" on the handhelds or calculator.

Other solutions to this problem of reducing end-user configuration in wireless networks include significant IT resources to configure all components (e.g. corporate networks) or re-architecting the network to have the same network name across multiple APs. However, using a wireless ID or MAC address allows a user to quickly configure a network.

This is also true for classroom networks. Using the wireless ID or MAC address, a teacher can quickly and easily configure a classroom network to ensure that the students or devices in the classroom can connect to the classroom's network, without needing special instructions to the students. In one embodiment, a system can also be pre-configured by a distributor or a factory prior to shipping to the end customer, further simplifying and improving the use experience. Thus, such a system, device and method allows for a fast, reliable configuration using wired connections (USB). Also, such embodiment scales to large number of clients and would not require configuration on an IT personnel.

Figure 1:
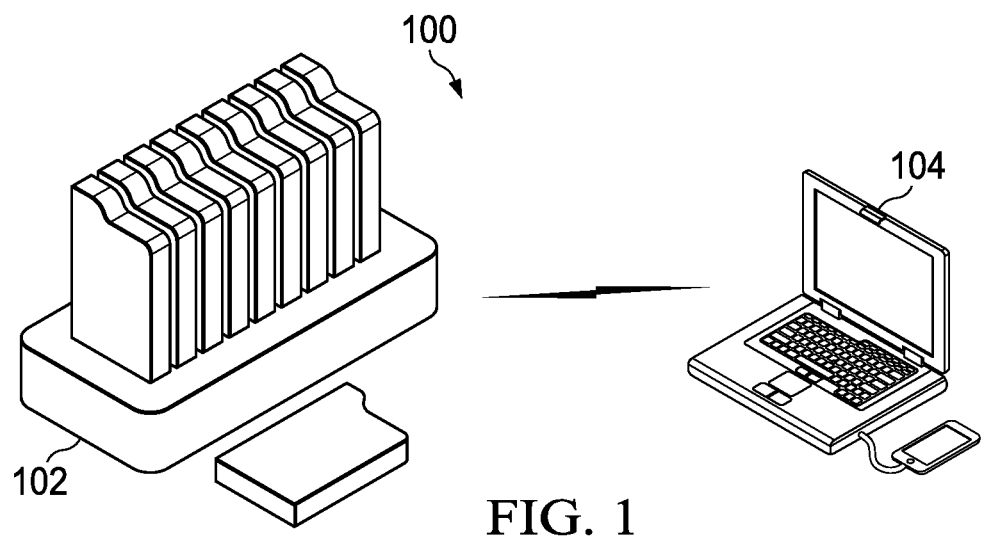
FIG. 1 is an embodiment of a system capable of reliable configuration for network access.

FIG. 1 is an embodiment of a system 100 for reliable configuration for network access. The system 100 includes handheld devices 102 and a computer 104. In this embodiment, the handheld devices are shown to be calculators. FIG. 1 depicts 10 handhelds devices 102; however, the mechanism can easily scale to any number of wireless clients. The computer 104 may function as a server, host, mainframe, or any device or system that configures a network. The computer 104 is capable of performing a method 300, described herein below and shown in FIG. 3.

Figure 2:
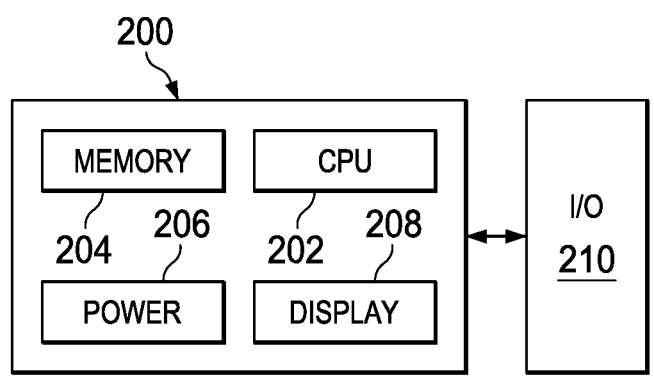
FIG. 2 is an embodiment of a block diagram of a device capable of reliable configuration for network access.

FIG. 2 is an embodiment of a block diagram of a device 200 for reliable configuration for network access. The device 200 includes a CPU 202, a memory 204, power module 206, display 208 and I/O module 210. The device 200 is capable of being configured to allow clients access to a network. The CPU 202 may include any suitable combination of software, firmware, and hardware. The CPU 202 may include one or more digital signal processors (DSPs), microprocessors, discrete logic, application specific integrated circuits (ASICs), field-programmable gate arrays (FPGAs), etc. The memory 204 may be internal or external to the device 200 and may be a read only, write only, read/write, transitory, non-transitory and the likes. The power 206 may be electric, battery or solar power. The Input/output (I/O) module 210 may be internal, external or coupled to the device 200. The device 200 is capable of performing the method 300, described herein below.

Figure 3:
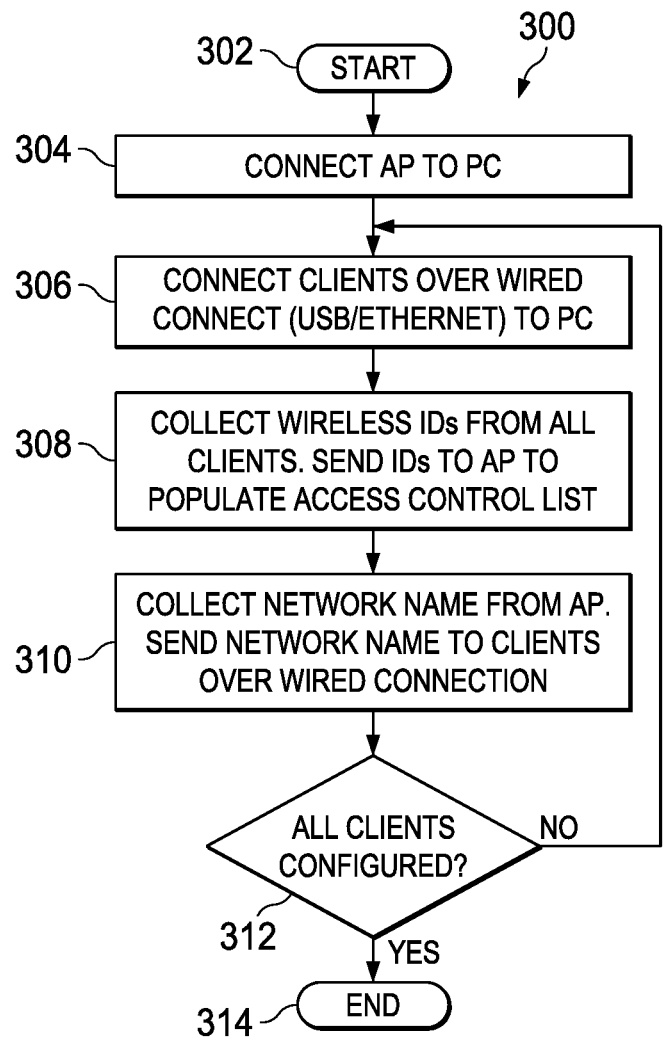
FIG. 3 is an embodiment of a flow diagram depicting a method for reliable configuration for network access.

FIG. 3 is an embodiment of a flow diagram depicting a method 300 for reliable configuration for network access. The method 300 starts at step 302 and proceeds to step 304, wherein the method 300 connects the network controller to the computer/PC. At step 306, the method 300 connects one or more clients over wired connect (USB/Ethernet) to the PC. At step 308, the method 300 collects wireless IDs or MAC addresses from all clients and sends them to AP to populate access control list. At step 310, the method 300 collects network name from AP and sends network name to clients over wired connection. At step 312, the method 300 determines if all devices have been configured. If there are more devices to configure, the method 300 returns to step 306; otherwise, the method 300 proceeds to step 314. The method 300 ends at step 314.

While the foregoing is directed to embodiments of the present invention, other and further embodiments of the invention may be devised without departing from the basic scope thereof, and the scope thereof is determined by the claims that follow.

What is claimed is:

1. A system, comprising:
    an access point (AP) coupled to a computer, the AP configured to store an access control list for a wireless network and a network name for the wireless network;
    a first wireless client plugged into a docking station, the docking station coupled to the computer by a universal serial bus (USB) connection; and
    the computer, wherein the computer comprises a software application for configuring the wireless network, the software application configured to:
        collect a first wireless address from the first wireless client over the USB connection and send the first wireless address to the AP to populate the access control list; and
        collect the network name from the AP and send the network name to the first wireless client over the USB connection.

2. The system of claim 1, wherein the first wireless client is one of a calculator, a tablet, a computer, and a handheld device.

3. The system of claim 1, wherein the wireless network is a classroom network.

4. The system of claim 1, further comprising:
    a second wireless client plugged into the docking station, the second wireless client and the first wireless client coupled to the computer at a same time,
    wherein the software application is further configured to:
        collect a second wireless address from the second wireless client over the USB connection and send the second wireless address to the AP to populate the access control list; and
        send the network same to the second wireless client over the USB connection.

5. The system of claim 1, wherein the first wireless address is a media access control (MAC) address.

6. A method for configuration of a wireless network, comprising:
    collecting, over a universal serial bus (USB) connection by a software application executing on a computer, a first wireless address from a first wireless client plugged into a docking station, the docking station coupled to the computer by the USB connection and sending, by the software application, the first wireless address to an access point (AP) coupled to the computer to populate an access control list; and
    collecting, by the software application, a network name for the wireless network from the AP and sending, by the software application, the network name to the first wireless clients over the USB connection.

7. The method of claim 6, wherein the first wireless client is one of a calculator, a tablet, a computer, and a handheld device.

8. The method of claim 6, wherein the wireless network is a classroom network.

9. The method of claim 6, further comprising:
    collecting, by the software application, a second wireless address over the USB connection from a second wireless client plugged into the docking station and sending the second wireless address to the AP to populate the access control list, wherein the second wireless client and the first wireless client are coupled to the computer at a same time; and
    sending the network name to the second wireless client over the USB connection.

10. The method of claim 6, wherein the first wireless address is a media access control (MAC) address.

11. A system, comprising:
    an access point (AP) coupled to a computer, the AP configured to store an access control list for a wireless classroom network and a network name for the wireless classroom network;
    a plurality of wireless handheld devices plugged into a docking station, the docking station coupled to the computer by a universal serial bus (USB) connection; and
    the computer, wherein the computer comprises a software application for configuring the wireless classroom network, the software application configured to:
        collect a media access control (MAC) address from each wireless handheld device of the plurality of wireless handheld devices over the USB connection and send each collected MAC address to the AP to populate the access control list; and
        collect the network name from the AP and send the network name to each wireless handheld device of the plurality of handheld devices over the USB connection.

* * * * *